United States Patent
Björklund et al.

(10) Patent No.: US 6,878,062 B2
(45) Date of Patent: Apr. 12, 2005

(54) METHOD FOR PERFORMING GAMES

(75) Inventors: Magnus Björklund, Spånga (SE); Peter Cedlöf, Tyresö (SE); Helena Holmgren, Johanneshov (SE); Rune Torbjörnsen, Lidingö (SE)

(73) Assignee: Anoto AB, Stockholm (SE)

( * ) Notice: Subject to any disclaimer, the term of this patent is extended or adjusted under 35 U.S.C. 154(b) by 78 days.

(21) Appl. No.: 10/114,941

(22) Filed: Apr. 4, 2002

(65) Prior Publication Data
US 2003/0022717 A1 Jan. 30, 2003

Related U.S. Application Data
(60) Provisional application No. 60/281,784, filed on Apr. 6, 2001.

(30) Foreign Application Priority Data
Apr. 6, 2001 (SE) .............................................. 0101250

(51) Int. Cl.$^7$ .................................................. A63F 9/24
(52) U.S. Cl. ............................ 463/17; 463/18; 463/19; 463/37; 463/42
(58) Field of Search ................................ 463/1, 16–20, 463/36–37, 39–42; 178/18.01, 18.03, 19.01, 19.05; 345/156, 180, 181; 250/227.13

(56) References Cited

U.S. PATENT DOCUMENTS

| | | | | |
|---|---|---|---|---|
| 4,856,787 A | * | 8/1989 | Itkis ............................ 273/237 |
| 5,054,787 A | * | 10/1991 | Richardson .................. 463/19 |
| 5,192,076 A | * | 3/1993 | Komori ........................ 463/18 |
| 5,478,084 A | * | 12/1995 | Itkis ............................ 273/239 |
| 5,652,412 A | * | 7/1997 | Lazzouni et al. ......... 178/18.01 |
| 5,791,991 A | * | 8/1998 | Small ........................... 463/41 |
| 5,813,911 A | * | 9/1998 | Margolin ...................... 463/19 |
| 6,149,522 A | * | 11/2000 | Alcorn et al. ................. 463/29 |
| 2002/0094860 A1 | * | 7/2002 | Itkis et al. .................... 463/19 |

FOREIGN PATENT DOCUMENTS

| | | |
|---|---|---|
| EP | 0 281 257 A1 | 9/1988 |
| GB | 2 147 773 A | 5/1985 |
| WO | 83/02842 A1 | 8/1983 |
| WO | 99/50751 A1 | 10/1999 |
| WO | 99/50787 A1 | 10/1999 |
| WO | 00/00928 A1 | 1/2000 |
| WO | 00/72244 A1 | 11/2000 |
| WO | 00/73983 A1 | 12/2000 |
| WO | 01/16691 A1 | 3/2001 |
| WO | 01/26032 A1 | 4/2001 |
| WO | 01/26033 A1 | 4/2001 |
| WO | 01/48591 A1 | 7/2001 |
| WO | 01/48654 A1 | 7/2001 |
| WO | 01/48678 A1 | 7/2001 |
| WO | 01/48685 A1 | 7/2001 |
| WO | 02/39349 A1 | 5/2002 |

* cited by examiner

*Primary Examiner*—Michael O'Neill
(74) *Attorney, Agent, or Firm*—Birch, Stewart, Kolasch & Birch, LLP

(57) ABSTRACT

A method for carrying out a game of the type comprising the steps of noting written information on a writing surface with the aid of a writing means. The writing surface is provided with a position-coding pattern and the writing means is a combined writing and reading unit, which continually reads its movement across the writing surface. The information is converted into digital signals and is sent via a communication system to a recipient which returns feedback on the received information. Games that can be performed by means of such a method are pools, lotto, betting and various other games comprising the use of pen and paper to be carried out.

34 Claims, 3 Drawing Sheets

METHOD FOR PERFORMING GAMES

This application claims priority on provisional Application No. 60/281,784 filed on Apr. 6, 2001, the entire contents of which are hereby incorporated by reference.

FIELD OF THE INVENTION

The present invention relates to a method for performing games of the type that comprises noting, with the aid of a writing means, written information on a writing surface.

BACKGROUND ART

When participating in different kinds of betting or games such as lotto, pools, harness racing, horse and dog racing, use is made of special preprinted coupons where the better fills in, for instance, the number of a competitor on which he puts his money to be the winner, the outcome of a match between two teams, or the numbers which the better believes are to be drawn in the next drawing. Then the better must go to a special betting shop, i.e. a place taking bets, to deliver the coupon which is then stamped or read in a machine, payment is made and the better gets a receipt for his participation in the game.

Several drawbacks are involved in such a betting method. For instance, coupons must be printed, which many times are unique to each round of games, and must be available in special betting shops before each round of games, and the better must thus go to the betting shop to obtain the correct coupon. Moreover, the better, after filling in the coupon, must go to a betting shop before a certain point of time to deliver the coupon, make the payment and get his receipt. In many cases the better does not obtain and deliver his coupons on the same occasion since, as a rule, he wants to carefully consider which alternatives are worth betting on. The latest point of time for delivering the coupon is usually relatively long before each round of games owing to the limited opening and closing hours of the betting shop, the administration of coupons and the like. Furthermore the betting company does not know who the better is, and in case of a prize the better must go to a betting shop with his signed coupon and collect the prize. Of course, these drawbacks act in a restricting manner for prospective betters taking part in the game and cause great time expenditure, planning and physical movement for betters taking part in the game. There is thus a need for simplifying the betting method on account of the betting shop as well as the better.

In addition to the above-mentioned types of betting where the betters bet their money on the outcome of an event such as a competition, match or lottery, there are many other kinds of party or amusement games, such as many forms of games or amusements where the participants use pen and paper to note text and/or figures. Examples of such games are Sinking ships, Tick-tack-toe, Pictionary, Bingo etc. These games require that the participants, who can be two people or more, be positioned close to each other during the game since a high degree of interactivity between the participants is necessary. It goes without saying that this restricts the possibilities of performing the games.

BRIEF DESCRIPTIONS OF THE INVENTION

The present invention aims at obviating drawbacks and restrictions of games of the type mentioned by way of introduction and providing a method for performing games and providing amusement, in which the possibilities of performing the game increase and the geographical location of a participant is of no significance.

Principles of the present invention can be worked in different ways and applied to many types of games and amusements. It is to be understood that the term writing and reading unit is to be interpreted in a wide sense, and the unit can in some cases serve as a pure input means that does not leave any legible writing, but only records the movement across a surface.

Examples of writing and reading units and position-coding patterns that are usable for carrying out the method are disclosed, for instance, in commonly-owned U.S. Pat. No. 6,570,104 (U.S. application Ser. No. 09/580,338), U.S. application Ser. No. 09/652,838, U.S. Pat. No. 6,663,008 (U.S. application Ser. No. 09/676,914), U.S. Pat. No. 6,674,427 (U.S. application Ser. No. 09/676,893), U.S. 2002/0091711 (U.S. application Ser. No. 09/746,778), U.S. 2003/0084002 (U.S. application Ser. No. 09/746,781), U.S. 2003/0046256 (U.S. application Ser. No. 09/746,780) and U.S. 2003/0061188 (U.S. application Ser. No. 09/746,506) which are incorporated herewith by reference.

According to a preferred embodiment of the invention, the written information is temporarily stored in the writing and reading unit and the user can select the point of time for sending the written information, for instance, by actuating a send button on the writing and reading unit or by moving the writing and reading unit across a specific place on the writing surface which has a specially designed position-coding pattern which is reserved for the purpose and triggers the writing and reading unit to send on the information.

The recipient can, at least in a first step, be, for instance, a computer, a PDA (Personal Digital Assistant) or a mobile phone. The transmission can take place wirelessly by means of e.g. IR light or radio waves, such as the short-range wireless connection specification called BLUETOOTH®, but could also take place by a cable, electrically or optically. From this first receiving unit, the information can be forwarded via, for instance, the stationary telephone network, the mobile telephone network, the Internet or a computer network to, for instance, a betting company, an opponent or a computer unit where the appropriate software is available.

In an embodiment of the invention, the method is used to bet on the outcome of events, such as competitions, matches and lotteries, optionally in combination with the betting of money. According to the invention, this can be carried out by filling in coupons which are preprinted on a sheet of paper, or some other, preferably writable surface which has the specific position-coding pattern. The coupons can be printed separately in a conventional manner, in which case the participant has to fetch the coupons from a betting shop. The coupons can, however, also may be printed in and distributed by newspapers along with, for instance, match programs. Then it is possible to let the position-coding pattern be unique and identifiable to different newspaper publishers. In this way, the betting company can read out which newspaper has reached the largest number of participants. The coupons may, however, also be downloaded electronically via e.g. the internet or e-mail.

Identification of the participant can conveniently take place by means of the writing and reading unit which can be designed to send a unique identification signal, e.g. in form of a number combination, connected to the participant and/or the writing and reading unit. This can be achieved for example by an identification signal which is sent automatically from the writing and reading unit together with the transmitted information, or by a PIN-code which is entered by the participant. Besides identifying the participant, the identification signal may be utilized for encryption of the sent information between the participant and the recipient, e.g. a betting company.

Moreover, the payment for participating in the game can suitably take place via a betting account which the participant has in the betting company and which he can order to be charged via the writing and reading unit. Moreover a possible payment of prize can be made to such a betting account. However, it would also be possible to charge the costs to a Telecom operator to which the writing and reading unit is connected. Regarding different methods of payment, reference is made to U.S. 2002/0059140 (U.S. application Ser. No. 09/987,151). Thanks to the identification via the writing and reading unit, it is possible for the betting company to pay a prize directly to the participant's account.

The preprinted coupons can suitably be designed in a conventional manner with special boxes intended for filling in winners, match results, numbers and the like. The transferring of the information can be carried out in essentially two ways. On the one hand, the position-coding pattern in the box that has been filled in can itself be the carrier of the information, i.e. the position-coding pattern in the box in question is especially reserved for a specific character or alternative, for instance a number in a lottery or the outcome of a match such as 1×2 in connection with results pool. However, the information could also be identified by interpretation of the characters written by the participant in a certain area, and the position-coding pattern is used to identify where on the coupon the characters have been written.

After the information has been forwarded, it is processed by the betting company in question, for instance by automatic data processing where the participant is identified, and by checking that everything has been correctly filled in and, where appropriate, that everything is in order as regards payment. This may also comprise that the betting company checks with, for instance, a bank or credit card company whether the participant can be charged. As a preferred alternative, a confirmation is then sent to the participant, for instance via his mobile phone, PDA or computer. It may then be convenient that the participant then has to accept the confirmation from the betting company before the game is finally recorded and becomes binding for both parties. The confirmation and the subsequent acceptance may then serve as a receipt for the participant to later prove his betting.

In an alternative embodiment of the invention, it will be possible to play party or amusement games against one or more additional opponents or against stored software by writing or drawing, using the writing and reading unit, on a writing surface provided with a position-coding pattern, for instance a sheet of paper. The participant and any opponents and/or optional software need not be positioned in the same place, but the game can be carried out by telecommuting as pure amusement at their leisure, while waiting in a line or in a waiting room or while traveling. Like in the betting method described above, the writing and reading unit reads how it is being moved across the sheet of paper. The information is digitized and sent by wire or wirelessly to, for instance, a mobile phone, a PDA or a computer. Then the information can be sent on to a corresponding receiving unit of an opponent where the information is presented to him. However, the game could also take place locally, involving only the participant's receiving unit and involving an opponent which is positioned in the same place, and in that case the receiving unit is used as a display for both participants. However, the play could also take place involving computer software stored in the receiving unit. The writing and reading unit can also be used as a pointer for moving parts of the game appearing on the display.

Conceivable types of game that are suitable for this alternative method of playing are all those where pen and paper are normally used to carry out the game, such as Pictionary, Sinking ships, Bingo and crosswords. For instance, it would be possible to provide blocks or pads where different kinds of game are collected and preprinted on a sheet of paper with a position-coding pattern for use as amusement while waiting or the like. However, it would be possible to apply this method also to other kinds of amusement games where pen and paper are normally not used. As an example, mention can be made of quiz games where the participant receives a question via the display, a playing card or a newspaper, and by marking an alternative on the playing card, in the newspaper or on a neutral sheet of paper and sending the answer to the receiving unit, he will receive immediate feedback whether the answer was correct or not.

DESCRIPTION OF PREFERRED EMBODIMENTS OF THE INVENTION

Figure 1:
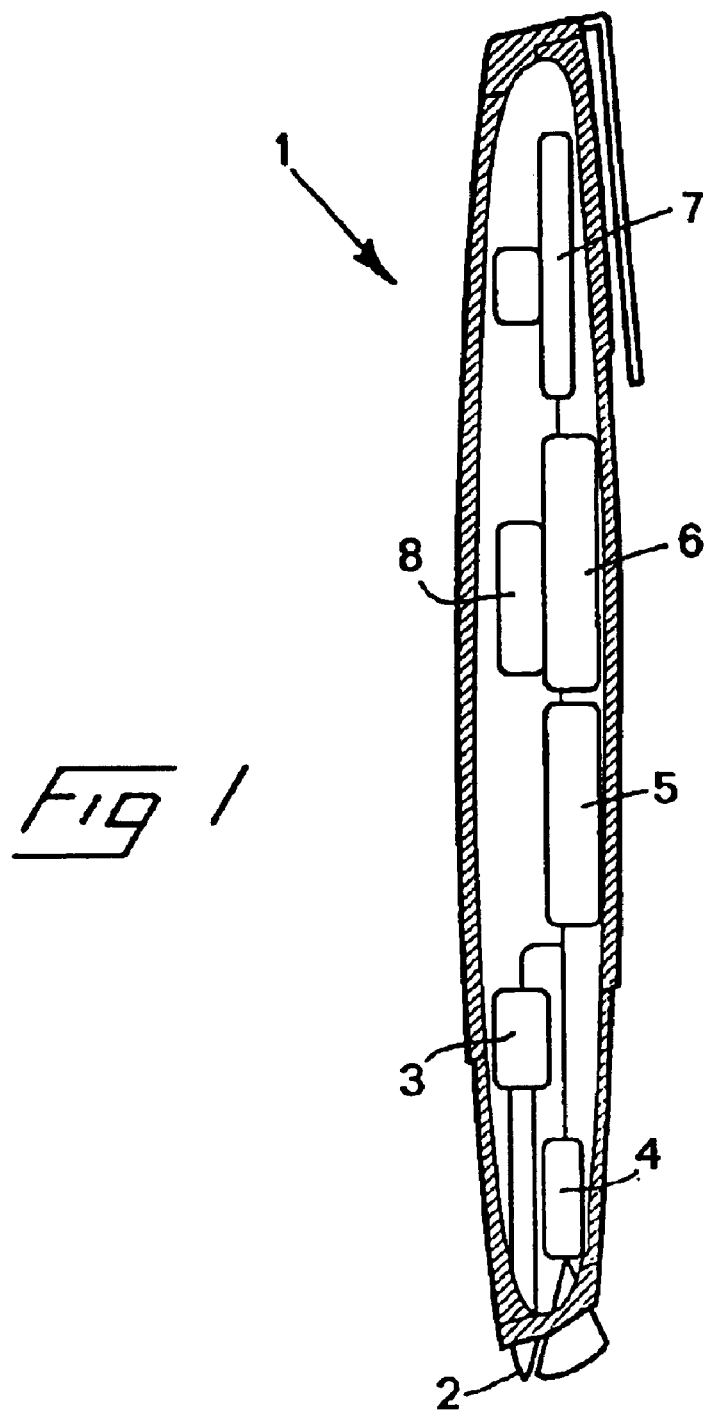
FIG. 1 is a schematic sectional view of a writing and reading unit which is usable for carrying out a method according to the invention.

Reference is first made to FIG. 1, which shows a conceivable embodiment of a writing and reading unit 1. This has mainly the shape of a pen with a pen point 2, conveniently a ball point pen with an ink cartridge 3. 4 designates a camera with a lens which is directed downwards at the side of the pen point 2. A pressure sensitive sensor activates, when the pen point 2 is in contact with the writing surface, the camera to register the movement over a position-coding pattern on the writing surface across which the pen is moved. The camera communicates with a processor 5, in which the camera image is digitized and interpreted, and the image data is then stored in a memory 6. When the desired amount of written information has been stored in the memory, this can be transmitted at an optional time and be sent on wirelessly via a transmitter 7 which in a preferred embodiment is a so-called BLUETOOTH® transmitter (i.e., short-range wireless transmitter). 8 designates a battery, which supplies electric current to the writing and reading unit.

Figure 2:
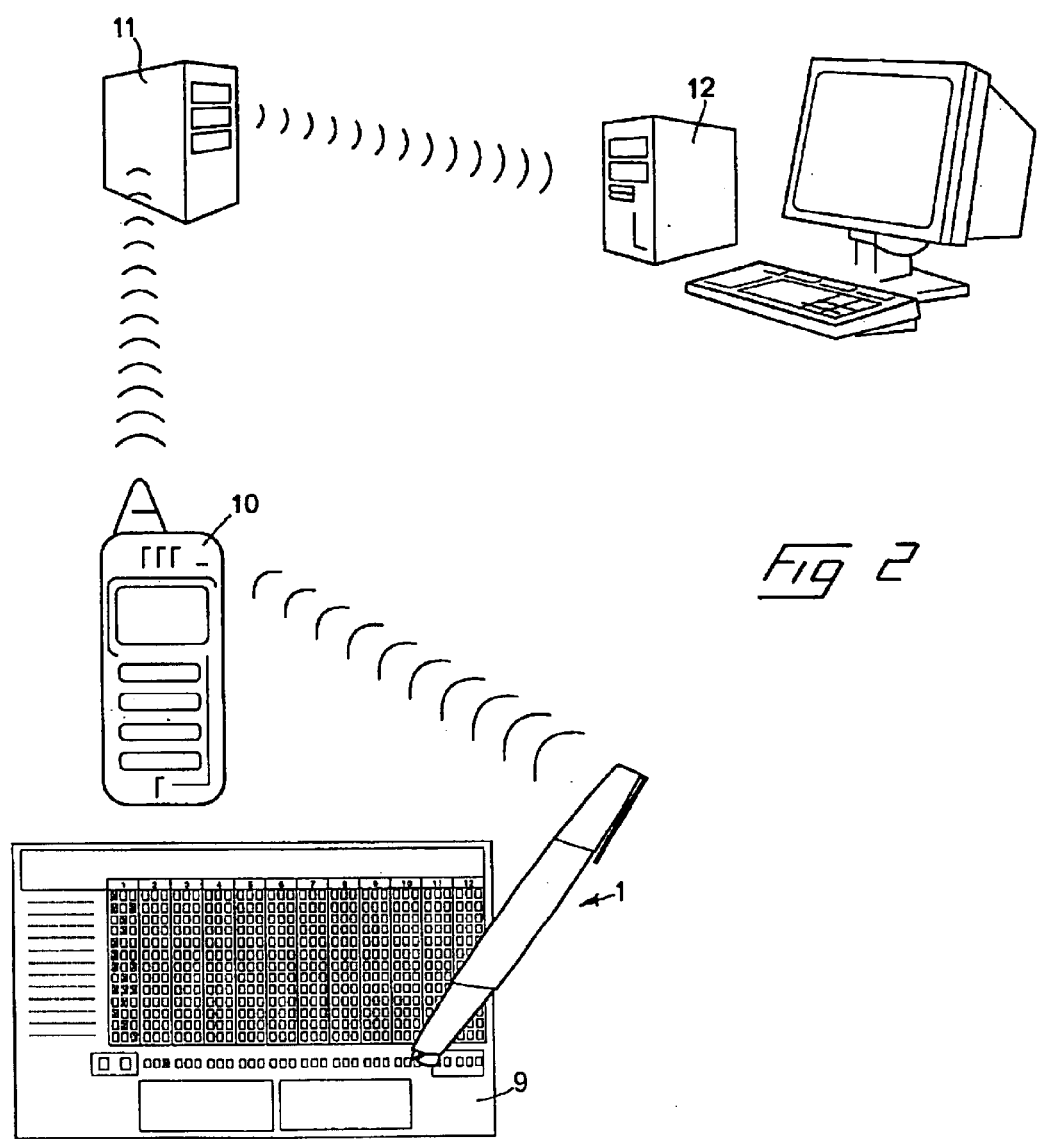
FIG. 2 is a schematic illustration of how to carry out a first embodiment of the invention, and conceivable equipment therefor.

Then reference is made to FIG. 2, which illustrates a possible way of carrying out a method according to a first embodiment of the invention. In this embodiment, a person is to participate in a game and bet money on guessing the outcome of an event such as a competition, match or lottery. To this end, a preprinted coupon 9 is used. This is in a conventional manner provided with e.g. text for the matches on which a bet is to be made and boxes where the participant marks the chosen alternative, for instance the winning team or draw. However, the coupon is special in so far as it is provided with a position-coding pattern on at least the writing surfaces that are to be filled in, and this position-coding pattern is read in connection with the filling in by means of the writing and reading unit 1. The information about the selected alternatives is thus stored in the memory 6 of the writing and reading unit, and when the coupon has been completed, the participant can choose to send the information, for instance by marking a specific send box on the coupon. The transmitter in the writing and reading unit is thereby actuated and the information is sent via a suitable communication system to a recipient, for instance a betting company. The communication system can be of an optional kind and is in the shown example a mobile telephone system, which is illustrated by a mobile phone 10 which sends the information to a central server 11, from which the information is passed on to a local server 12 of the betting company. There the received information is processed in a conventional, and preferably automatic, manner, which conveniently comprises identifying the participant, for instance by a unique identification signal from the writing and reading unit 1, checking that the coupon is correctly filled in and that everything is in order as regards payment for participating in the game. If everything is in order, the betting company sends a confirmation in the opposite direction, which suitably is shown on the display of the mobile phone. Before the game is finally recorded, it is convenient for the participant to accept the particulars in the confirmation. The acceptance can take place by means of the writing and reading unit 1 as well as direct via the mobile phone 10. Such a method for carrying out a game involves a number of advantages. The participant has documentation regarding the performed game by means of the filled-in coupon and, besides, a receipt by means of the confirmation from the betting company, which can be stored in the mobile phone or transferred to another medium, such as a computer, or a paper printout. The betting method further makes it easier for the participant to participate in the game since the coupon need not be delivered to a specific betting shop. There is also the possibility of an extended deadline for participating in the round of games until a time closer to the round of games or the drawing.

Figure 3:
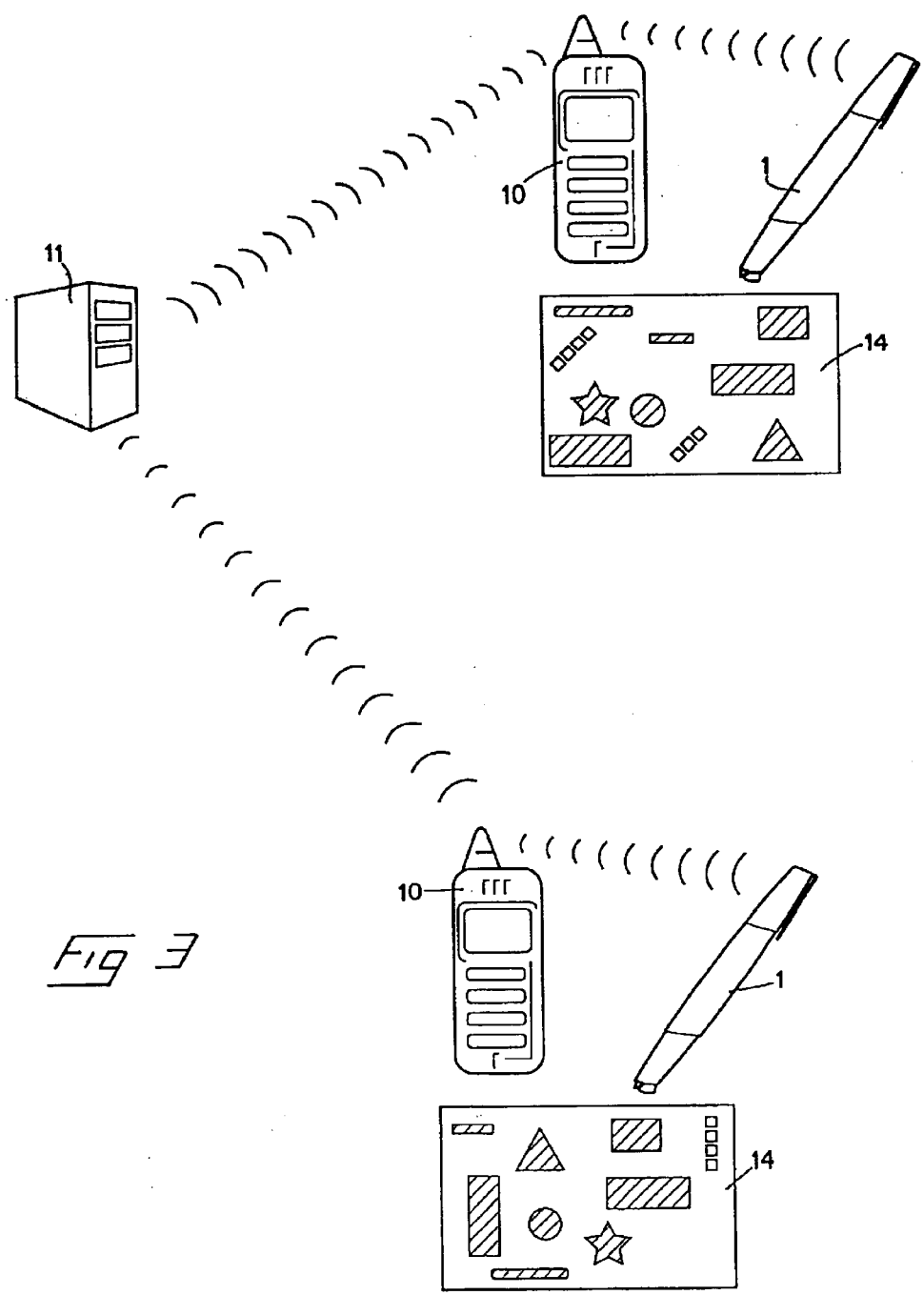
FIG. 3 is a schematic illustration of how to carry out a second embodiment of the invention and conceivable equipment therefor.

FIG. 3 shows an alternative method for performing games according to the invention. This embodiment comprises party or amusement games where a participant plays against one or more additional participants, optionally in combination with software, or the participant plays merely against software. In the example illustrated, two participants are playing against each other, and an advantage of the method is that the participants need not be situated at the same place. Each of the participants has a writing and reading unit 1 of the type described above and a writing surface, suitably in the form of a sheet of paper 14 which is provided with a position-coding pattern and which, according to the form of game, can optionally be essentially blank or have the form of a preprinted playing board. The method is well suited for such kinds of game which comprise a great measure of interactivity between the participants or a participant and software and which besides comprise drawing figures, marking e.g. boxes or writing text/numbers/symbols by means of a pen. The writing and reading units 1 of both participants communicate with a convenient communication system, which in the Figure is illustrated by two mobile phones 10 which in turn communicate with each other, preferably via a server 11. As the game proceeds, the participants act alternatingly by writing using the writing and reading unit 1 and sending the information via the mobile phones 10, the result of the writing being illustrated to the other participant on the display of his mobile phone or by acoustic signals. The practical performance of a game according to the method can in practice be varied almost infinitely. Instead of mobile phones, use can be made of, for instance, a computer or a PDA which both have a larger display than a mobile phone, thus improving the possibilities of illustrating the game as it proceeds. The method may also comprise interaction with some form of game software which can be stored either locally with a participant or centrally with a game company. Such software also allows the performing of games using pen and paper with only one participant against software. Below follows some examples of kinds of games which can be performed by means of a method according to the invention.

Sinking ships: The game is performed against software, locally or centrally stored, or an opponent. The ships are positioned by means of the writing and reading unit and can optionally be stored in software or a playing board is provided by the software in which the ships have been positioned randomly. During the game, shots are marked in optional boxes and hits or misses are marked optionally by the opponent or the software, for instance by means of acoustic signals.

Pictionary: This kind of game implies that two or more participants are to illustrate a word by means of a drawing and another participant is to guess the intended word as quickly as possible. The word can conveniently be given randomly by software. This kind of game is facilitated if the writing and reading unit is designed so as to send the read information continually via the communication system without intermediate storage of the information.

Crosswords: A preprinted crossword in interaction with software gives the participant the possibility of being rapidly corrected and getting immediate feedback whether the crossword is correctly filled in. However, correction requires that the writing and reading unit or the software can interpret the characters written in each box.

Bingo: The participant has preprinted bingo coupons and receives numbers via a communication device such as a mobile phone. As the numbers are being presented, the participant marks any hits on the coupon. When a full row of numbers has been obtained, the participant causes the information to be sent to the bingo operator which checks whether the row is correct, the identity and the like and pays out a prize if any.

Voting: To establish various hit lists of different kinds, for instance music, artists, movies. Can be combined with some form of lottery for the participants. When carrying out the voting, the identity of the writing and reading unit should be recorded so that it can be used for voting only once.

What is claimed is:

1. A method for performing games based on a game participant's positioning of a writing and reading unit on a writing surface, said method comprising:

detecting positioning of said writing and reading unit on the writing surface, said writing surface being on a pre-printed gaming form with game-related graphics and a position-coding pattern printed thereon, by repeatedly reading the position-coding pattern on said writing surface as said game participant positions said writing and reading unit on said writing surface, wherein said position-coding pattern codes coordinate information and is spatially interrelated with said game-related graphics, converting the information detected by the writing and reading unit into digital signals, and transmitting the digitized information via a communication system to a recipient.

2. A method for performing games as claimed in claim 1, wherein the writing and reading unit detects its position on the writing surface and leaves written information, which is legible to a participant's eye, on the writing surface.

3. A method for performing games as claimed in claim 1, wherein feedback on the transmitted information is received from the recipient via the communication system.

4. A method for performing games as claimed in claim 1, wherein said writing surface is a preprinted coupon for betting on the outcome of an event.

5. A method for performing games as claimed in claim 4, wherein money is bet on the outcome of the event.

6. A method for performing games as claimed in claim 4, wherein the coupon is completed and the information is stored in the writing and reading unit before the information is transmitted to the recipient.

7. A method for performing games as claimed in claim 4, wherein a confirmation is received from a betting company which arranges the game.

8. A method for performing games as claimed in claim 7, wherein the participant gives his acceptance of the confirmation from the betting company before the game is registered as being valid.

9. A method for performing games as claimed in claim 1, wherein the game is performed as a party game or amusement game against one or more opponents and/or software.

10. A method for performing games as claimed in claim 1, wherein the writing and reading unit transmits the information continually to the receiving unit without intermediate storage.

11. A method for performing games as claimed in claim 1, wherein a game operator provides blocks or pads with different games that can be used as entertainment by a participant as desired.

12. A method for performing games as claimed in claim 1, wherein the writing and reading unit transmits a unique identification signal which is utilized by the recipient for identifying the participant and/or the writing and reading unit.

13. A method for performing games as claimed in 1, wherein the information between the participant and the recipient is transmitted in encrypted form by utilizing a unique identification signal of the writing and reading unit.

14. A method for performing games as claimed in claim 1, wherein the writing and reading unit transmits the information to a local receiving unit which stores gaming software for automatic processing of the transmitted information.

15. A method for performing games as claimed in claim 1, wherein the writing and reading unit transmits the information via a communication network to a remote receiving unit which stores gaming software for automatic processing of the transmitted information.

16. A method for performing games as claimed in claim 3, wherein said feedback comprises visual feedback on a display device.

17. A method for performing games as claimed in claim 3, wherein said feedback comprises an acoustic signal.

18. A method for performing games as claimed in claim 1, wherein said position-coding pattern is unique for a set of gaming forms.

19. A method for performing games as claimed in claim 1, wherein said recipient derives position-related data from the transmitted information, said position-related data being recorded in said reading of the position-coding pattern by the writing and reading unit.

20. A method for performing games as claimed in claim 19, wherein said recipient identifies said gaming form from said position-related data.

21. A method for performing games as claimed in claim 1, wherein said recipient associates a betting account with the writing and reading unit.

22. A system for performing games based on a game participant's positioning of a writing and reading unit on a writing surface, said system comprising:

a pre-printed gaming form with game-related graphics and a position-coding pattern printed thereon, wherein said position-coding pattern codes coordinate information and is spatially interrelated with said game-related graphics; and a writing and reading unit, said writing and reading unit detecting its position on a writing surface of said pre-printed gaming form by repeatedly reading the position-coding pattern on said writing surface as said game participant positions said writing and reading unit on said writing surface.

23. The system for performing games as claimed in claim 22, further comprising:

a network connection device, said network connection device transmitting a signal in a communication network based on positioning information generated by said writing and reading unit.

24. The system for performing games as claimed in claim 22, further comprising:

a server, which processes positioning information generated by said writing and reading unit to control a game.

25. The system for performing games as claimed in claim 24, wherein said server is a gaming server associated with a gaming company, said system further comprising:

a central server, which communicates with said writing and reading device to direct said positioning information to said gaming server.

26. The system for performing games as claimed in claim 22, wherein said pre-printed gaming form and writing and reading unit are used by a first game participant and said system comprises an additional pre-printed gaming form and writing and reading unit for use by a second game participant, competing against said first game participant.

27. The system for performing games as claimed in claim 22, wherein said writing surface is a preprinted coupon for betting on the outcome of an event.

28. The system for performing games as claimed in claim 23, wherein said network connection device transmits said signal to a server that controls said game and receives feedback information from said server.

29. The system for performing games as claimed in claim 28, further comprising a display device, said display device receiving the feedback information from said network connection device and displaying the feedback information to the game participant.

30. The system for performing games as claimed in claim 28, further comprising an acoustic signal generator, said acoustic signal generator receiving the feedback information from said network connection device and generating an acoustic signal that represents said feedback information.

31. The system for performing games as claimed in claim 22, wherein said writing and reading unit outputs a unique identification signal which is utilized by a recipient to identify the participant and/or the writing and reading unit.

32. The system for performing games as claimed in claim 31, wherein said unique identification signal associates said writing and reading unit with a betting account.

33. The system for performing games as claimed in claim 23, wherein said signal is transmitted in encrypted form using a unique identification signal associated with said writing and reading.

34. The system for performing games as claimed in claim 22, wherein positioning information generated by said writing and reading unit identifies a game being played by said participant.

* * * * *